US008599424B2

(12) United States Patent
Vinocur et al.

(10) Patent No.: US 8,599,424 B2
(45) Date of Patent: Dec. 3, 2013

(54) PRINTER CARTRIDGE MICROCHIP

(75) Inventors: Sebastian Vinocur, Buenos Aires (AR); Adrian Tagliaferri, Buenos Aires (AR); Santiago Jose Bonarrigo, Centennial, CO (US)

(73) Assignee: FB Sistemas S.A., Buenos Aires (AR)

( * ) Notice: Subject to any disclaimer, the term of this patent is extended or adjusted under 35 U.S.C. 154(b) by 982 days.

(21) Appl. No.: 12/552,672

(22) Filed: Sep. 2, 2009

(65) Prior Publication Data

US 2010/0053684 A1 Mar. 4, 2010

Related U.S. Application Data

(60) Provisional application No. 61/094,222, filed on Sep. 4, 2008.

(51) Int. Cl.

| | |
|---|---|
| ***G06K 15/00*** | (2006.01) |
| ***G03G 15/00*** | (2006.01) |
| ***B41J 29/393*** | (2006.01) |

(52) U.S. Cl.

USPC ............... 358/1.16; 358/1.15; 399/12; 347/7; 347/19; 347/86

(58) Field of Classification Search

USPC ........... 358/1.9–1.16; 399/12–31, 82; 347/19, 347/17, 50, 152

See application file for complete search history.

(56) References Cited

U.S. PATENT DOCUMENTS

| | | | | |
|---|---|---|---|---|
| 5,625,384 | A * | 4/1997 | Numata et al. | 347/23 |
| 5,699,091 | A * | 12/1997 | Bullock et al. | 347/19 |
| 5,835,817 | A * | 11/1998 | Bullock et al. | 399/25 |
| 6,161,915 | A * | 12/2000 | Bolash et al. | 347/19 |
| 6,264,301 | B1 * | 7/2001 | Helterline et al. | 347/19 |
| 6,539,867 | B2 * | 4/2003 | Lee | 101/484 |
| 6,616,260 | B2 | 9/2003 | Skene et al. | |
| 6,754,460 | B2 | 6/2004 | Lewis et al. | |
| 6,830,391 | B2 * | 12/2004 | Clayvon et al. | 400/88 |
| 6,882,810 | B2 | 4/2005 | Karagiannis et al. | |
| 6,923,531 | B2 * | 8/2005 | Saruta | 347/86 |

(Continued)

FOREIGN PATENT DOCUMENTS

| | | |
|---|---|---|
| GB | 2350220 | 11/2000 |

OTHER PUBLICATIONS

English Abstract for JP2000-218824.
International Search Report for PCT/US2009/004972.

(Continued)

*Primary Examiner* — Twyler Haskins
*Assistant Examiner* — Dennis Dicker
(74) *Attorney, Agent, or Firm* — Preston Smirman; Smirman IP Law, PLLC

(57) ABSTRACT

Printer cartridge microchips that can be used in conjunction with several different types of printer cartridges and/or printer models or families are described. Several printer cartridge microchips are provided that respond to data or information requests and/or commands from the printer (e.g., the printer processor). If the correct data or information is stored on the microchip, the printer can then function with that particular cartridge. In order to optimize the memory requirements of the microchip, at least one separate read-only memory subunit and at least one writable memory subunit is provided in the memory element. Each of the read-only memory subunits can correspond to a particular printer model or family type. In this manner, several different printer model or family types can function with the use of a single microchip for the printer cartridge.

24 Claims, 9 Drawing Sheets

(56) References Cited

U.S. PATENT DOCUMENTS 6,940,613 B1 * 9/2005 Beard et al. .................. 358/1.13
7,068,954 B1 6/2006 Miller
7,088,928 B2 * 8/2006 Burchette et al. ............... 399/12
7,099,599 B2 8/2006 Karagiannis et al.
7,099,606 B2 8/2006 Karagiannis et al.
7,106,993 B1 9/2006 Miller
7,113,710 B2 9/2006 Miller
7,136,607 B1 11/2006 Miller
7,182,445 B2 2/2007 Johnson et al.
7,187,874 B1 3/2007 Miller
7,212,765 B2 5/2007 Lewis et al.
7,218,867 B2 5/2007 Burchette et al.
7,221,886 B1 5/2007 Miller
7,254,346 B2 8/2007 Burchette et al.
7,257,356 B2 8/2007 Miller
7,286,774 B1 10/2007 Miller et al.
7,315,708 B2 1/2008 Burchette et al.
7,319,833 B1 1/2008 Miller
7,356,279 B2 4/2008 Miller
7,362,988 B1 4/2008 Miller
7,398,033 B2 7/2008 Karagiannis et al.
7,424,245 B2 9/2008 Burchette et al.
7,447,464 B2 11/2008 Miller
7,512,360 B2 3/2009 Miller
7,515,837 B2 * 4/2009 Thacker et al. ................. 399/12
7,526,234 B2 4/2009 Miller
7,542,698 B2 6/2009 Burchette et al.
7,551,859 B2 * 6/2009 Miller et al. .................... 399/12
7,565,097 B2 7/2009 Miller
7,574,149 B2 8/2009 Burchette et al.
7,596,329 B2 9/2009 Burchette et al.
7,722,172 B2 * 5/2010 Silverbrook .................... 347/86
8,113,641 B2 * 2/2012 Silverbrook .................... 347/86
8,121,512 B2 * 2/2012 Miller ............................. 399/90
2002/0063760 A1 * 5/2002 Dietl et al. ...................... 347/86
2002/0191998 A1 * 12/2002 Cremon et al. ................. 400/76
2003/0170045 A1 9/2003 Lewis et al.
2004/0101320 A1 * 5/2004 Haramoto ....................... 399/12
2004/0181681 A1 * 9/2004 Salisbury ...................... 713/200
2004/0207865 A1 * 10/2004 Wachter et al. .............. 358/1.15
2005/0036795 A1 2/2005 Karagiannis et al.
2005/0036796 A1 2/2005 Burchette et al.
2005/0036800 A1 2/2005 Karagiannis et al.
2005/0219600 A1 * 10/2005 Lapstun et al. .............. 358/1.14
2005/0254838 A1 * 11/2005 Takahashi ....................... 399/12
2005/0271401 A1 12/2005 Burchette et al.
2005/0271415 A1 12/2005 Burchette et al.
2005/0281580 A1 12/2005 Lewis et al.
2006/0008293 A1 1/2006 Karagiannis et al.
2006/0034624 A1 * 2/2006 Burchette et al. ............... 399/12
2006/0045545 A1 3/2006 Burchette et al.
2006/0133848 A1 6/2006 Lewis et al.
2006/0153598 A1 7/2006 Miller
2006/0188275 A1 8/2006 Burchette et al.
2006/0245767 A1 11/2006 Burchette et al.
2006/0275050 A1 12/2006 Burchette et al.
2006/0285876 A1 12/2006 Karagiannis et al.
2007/0014592 A1 1/2007 Miller
2007/0019987 A1 1/2007 Miller
2007/0086806 A1 4/2007 Burchette et al.
2007/0127936 A1 6/2007 Miller
2007/0182794 A1 * 8/2007 Hatasa et al. ................... 347/86
2007/0183795 A1 8/2007 Burchette et al.
2007/0223942 A1 9/2007 Miller
2007/0223959 A1 9/2007 Lewis et al.
2007/0264040 A1 11/2007 Miller
2007/0264043 A1 11/2007 Miller
2007/0264044 A1 11/2007 Miller
2007/0297828 A1 12/2007 Causey et al.
2008/0145111 A1 6/2008 Miller
2008/0152377 A1 6/2008 Miller
2008/0152381 A1 6/2008 Miller
2008/0152382 A1 6/2008 Miller
2008/0152383 A1 6/2008 Miller
2008/0170866 A1 7/2008 Thacker et al.
2008/0187363 A1 8/2008 Miller
2008/0212994 A1 9/2008 Miller
2008/0260418 A1 10/2008 Karagiannis et al.
2008/0304859 A1 12/2008 Miller
2008/0317497 A1 12/2008 Burchette et al.
2009/0022513 A1 1/2009 Burchette et al.
2009/0190935 A1 7/2009 Thacker et al.
2009/0251513 A1 10/2009 Burchette
2010/0274948 A1 * 10/2010 Diehl et al. ................... 711/102

OTHER PUBLICATIONS

Written Opinion of the International Searching Authority for PCT/US2009/004972.

* cited by examiner

PRINTER CARTRIDGE MICROCHIP

CROSS-REFERENCE TO RELATED APPLICATION

The instant application claims priority to U.S. Provisional Patent Application Ser. No. 61/094,222, filed Sep. 4, 2008, the entire specification of which is expressly incorporated herein by reference.

FIELD OF THE INVENTION

The present invention relates generally to printers, and more specifically to printer cartridge microchips that can be used in conjunction with several different types of printer cartridges and/or printer models or families.

BACKGROUND OF THE INVENTION

An ink or toner cartridge is a replaceable component of an ink jet printer or laser jet printer, respectively, that contains the ink or toner that is transferred onto paper or other substrate during the printing process. Certain cartridge manufacturers also add electronic contacts and a microchip (typically more simply referred to as a “chip”) that allows the cartridge to “communicate” with the printer. Some of these newer microchips can supposedly recognize the associated printer model or printer family by simply monitoring one or more operational parameters of the printer, such as signal frequency, signal time intervals, signal voltage, and so forth.

Typically, two separate cartridges are inserted into a printer, e.g., one containing black ink and one with each of the three primary colors. Alternatively, each primary color may have a dedicated cartridge. All printer suppliers typically produce their own type of ink or toner cartridges. Cartridges for different printers may be incompatible, either physically or electrically.

A common business model for inkjet and laser jet printers involves selling the actual printer at or below production cost, while dramatically marking up the price of the (proprietary) ink or toner cartridges. Some inkjet and laser jet printers enforce this product tying using microchips in the cartridges to prevent the use of third-party or refilled ink or toner cartridges. The microchips can function by storing an amount of ink or toner remaining in the cartridge, which is updated as printing is conducted. Expiration dates for the ink or toner may also be used. Even if the cartridge is refilled, the microchip will indicate to the printer that the cartridge is depleted. For some printers, special circuit flashers are available that reset the quantity of remaining ink or toner to the maximum. Some manufacturers have been accused of indicating that a cartridge is depleted while a substantial amount of ink or toner remains in the cartridge.

Because replacement cartridges from the original manufacturer of the printer are often expensive, some other manufacturers produce “compatible” cartridges as inexpensive alternatives. These cartridges sometimes have more ink or toner than the original OEM branded ink or toner cartridges and can produce the same quality. Some people choose to use aftermarket inks or toners, wherein they can either refill their own ink or toner cartridge, buy aftermarket remanufactured brands, or take them to a local refiller. However, sometimes the microchips associated with these replacement, refilled or remanufactured cartridges do not perform well, or are compatible with only a few models of printers, or are expensive or complex to manufacture.

Accordingly, there exists a need for new and improved microchips for use with various types, models and families of printer cartridges that overcome at least one of the aforementioned problems.

SUMMARY OF THE INVENTION

New and improved printer cartridge microchips that can be used in conjunction with several different types of printer cartridges and/or printer models or families are provided to overcome the above-described deficiencies in the prior art. In accordance with the general teachings of the present invention, several embodiments of printer cartridge microchips are provided that respond to data or information requests and/or commands from the printer (e.g., the printer processor). If the correct data or information is stored on the microchips, and the proper responses are received, the printer can then function with that particular cartridge.

At no time during the previously described process, or any time subsequent thereto, do the cartridge microchips determine which specific printer model or printer cartridge it is interfacing with. Even if the printer or printer cartridge did transmit data or information to the cartridge microchip indicating the specific printer model or printer cartridge, the cartridge microchip would be unable and/or incapable of receiving, processing and/or understanding this data or information. Also, at no time during the previously described process, or any time subsequent thereto, does the cartridge microchip transmit to the printer or printer cartridge any information that would indicate that the cartridge microchip has awareness as to which specific printer model or printer cartridge it is interfacing with. By way of a non-limiting example, the communications between the printer or printer cartridge and the cartridge microchip are limited to specific data frame exchanges which do not contain any specific printer model or printer cartridge information. Thus, the cartridge microchips never have any awareness or recognition of what specific printer model or printer cartridge they are functioning with.

In accordance with one embodiment of the present invention, a cartridge chip for use with an imaging cartridge installed in an imaging device is provided, comprising a memory element storing imaging cartridge data, wherein the memory element includes a separate read-only memory subunit and a separate writable memory subunit, wherein the imaging device is selectively operable to read the memory element of the cartridge chip and write to the memory element of the cartridge chip, wherein the cartridge chip is unable to determine the type of the imaging device, wherein the cartridge chip is selectively operable to function with a plurality of imaging devices.

In accordance with one aspect of this embodiment, the read-only memory subunit includes a data frame corresponding to only a portion of an operational requirement of at least one imaging device. The writable memory subunit includes a data frame corresponding to a remainder of the portion of the operational requirement of at least one imaging device.

In accordance with another aspect of this embodiment, a plurality of separate read-only memory subunits are provided. The plurality of read-only memory subunits include data frames corresponding to only a portion of an operational requirement of a plurality of imaging devices. The writable memory subunit includes a data frame corresponding to a remainder of the portion of the operational requirement of the plurality of imaging devices.

In accordance with still another aspect of this embodiment, a controller is provided for controlling the operation of the cartridge chip. The controller can be selectively operable to transmit at least one data frame to the imaging device. The controller can be selectively operable to receive at least one data frame from the imaging device. The imaging cartridge data can be compatible with more than one type of imaging device.

In accordance with still yet another aspect of this embodiment, the imaging device can be selectively operable to transmit at least one data frame to the controller in order to initialize the cartridge chip. The controller can be selectively operable to transmit at least one data frame to the imaging device in order to acknowledge the initialization of the cartridge chip. The imaging device can be selectively operable to transmit at least one data frame to the controller in order to read the memory element of the cartridge chip. The controller can be selectively operable to transmit at least one data frame to the imaging device in order to acknowledge the reading of the memory element of the cartridge chip by the imaging device. The imaging device can be selectively operable to transmit at least one data frame to the controller in order to write to the memory element of the cartridge chip. The controller can be selectively operable to acknowledge the writing to the memory element of the cartridge chip by the imaging device. After a certain point in the communication protocol, the memory element of the cartridge chip can not transmit a correct data frame to another type of the imaging device.

In accordance with a further aspect of this embodiment, a radio frequency antenna can be operably associated with the memory element.

In accordance with another embodiment of the present invention, a method for operating an imaging system is provided, comprising providing a cartridge chip for use with an imaging cartridge installed in an imaging device, the cartridge chip including a memory element storing imaging cartridge data, wherein the memory element includes a separate read-only memory subunit and a separate writable memory subunit, and the imaging device selectively reading the memory element of the cartridge chip and writing to the memory element of the cartridge chip, wherein the cartridge chip is unable to determine the type of the imaging device, wherein the cartridge chip is selectively operable to function with a plurality of imaging devices.

In accordance with one aspect of this embodiment, the read-only memory subunit includes a data frame corresponding to only a portion of an operational requirement of at least one imaging device. The writable memory subunit includes a data frame corresponding to a remainder of the portion of the operational requirement of at least one imaging device.

In accordance with another aspect of this embodiment, a plurality of separate read-only memory subunits are provided. The plurality of read-only memory subunits include data frames corresponding to only a portion of an operational requirement of a plurality of imaging devices. The writable memory subunit includes a data frame corresponding to a remainder of the portion of the operational requirement of the plurality of imaging devices.

In accordance with still another aspect of this embodiment, a controller is provided for controlling the operation of the cartridge chip. The controller can transmit at least one data frame to the imaging device. The controller can receive at least one data frame from the imaging device. The imaging cartridge data can be compatible with more than one type of imaging device.

In accordance with still yet another aspect of this embodiment, the imaging device can transmit at least one data frame to the controller in order to initialize the cartridge chip. The controller can transmit at least one data frame to the imaging device in order to acknowledge the initialization of the cartridge chip. The imaging device can transmit at least one data frame to the controller in order to read the memory element of the cartridge chip. The controller can transmit at least one data frame to the imaging device in order to acknowledge the reading of the memory element of the cartridge chip by the imaging device. The imaging device can transmit at least one data frame to the controller in order to write to the memory element of the cartridge chip. The controller can acknowledge the writing to the memory element of the cartridge chip by the imaging device. After a certain point in the communication protocol, the memory element of the cartridge chip can not transmit a correct data frame to another type of the imaging device.

In accordance with a further aspect of this embodiment, a radio frequency antenna can be operably associated with the memory element.

Further areas of applicability of the present invention will become apparent from the detailed description provided hereinafter. It should be understood that the detailed description and specific examples, while indicating the preferred embodiment of the invention, are intended for purposed of illustration only and are not intended to limit the scope of the invention.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The present invention provides several different embodiments of cartridge microchips that can be used in conjunction with various printer cartridges that function with various imaging devices, such as printers.

Examples of these cartridge microchips are informally designated as the "2G microchip," the "3G microchip," the "4G microchip," and the "RF microchip," for reference purposes only.

Figure 1:
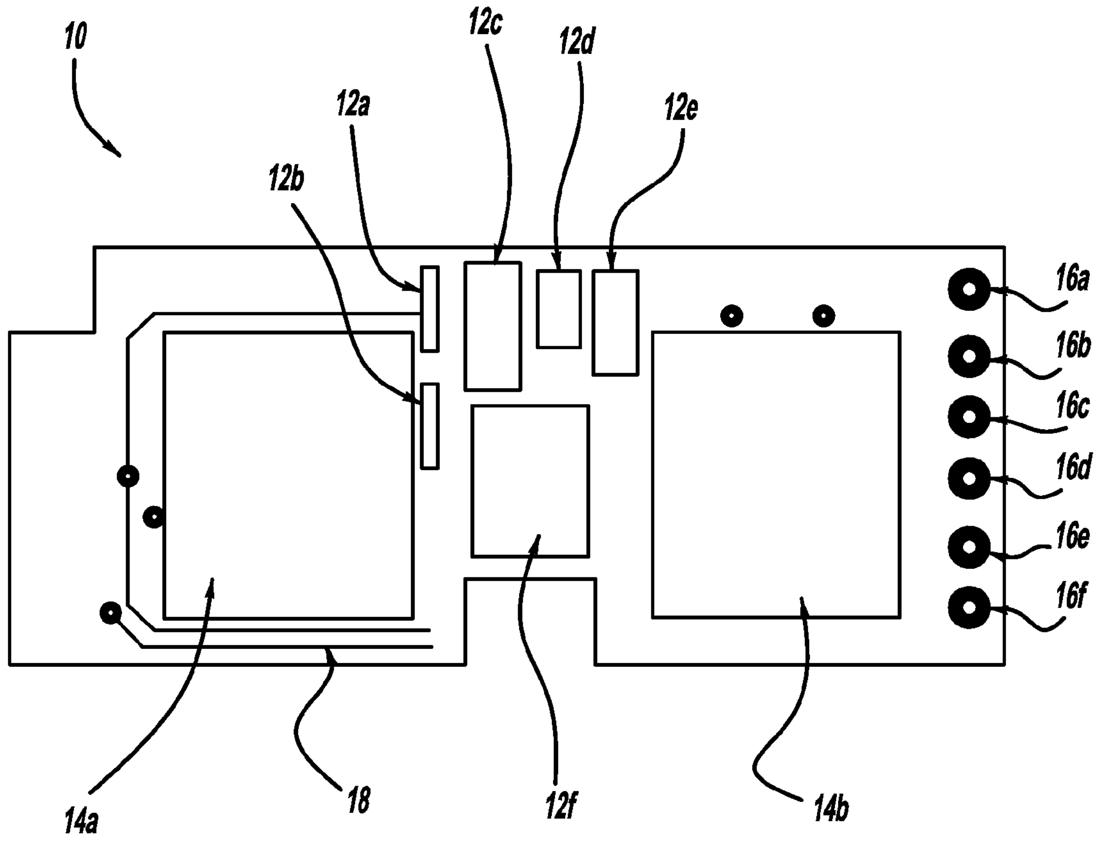
FIG. 1 is a schematic view of a printer cartridge microchip, in accordance with a first embodiment of the present invention.

Referring to FIG. 1, the 2G microchip, generally shown at 10, includes a plurality of electronics components 12*a*-12*f* (e.g., input/output (I/O) interface circuitry, a processor, a controller, and/or the like), and a pair of printer pads 14*a*, 14*b*, (e.g., electrical contacts). The printer pads are intended to establish an electrical connection between the printer and the cartridge microchip that allows the communication therebetween. In this embodiment, there are shown two printer pads; however, it should be appreciated that this number can be greater than this, e.g., 3 or 4. Also shown is a plurality of program pads 16*a*-16*f* (e.g., memory modules), all of which can be mounted onto one major face of a body (e.g., a mounting plate). The program pads are used to program the microcontroller. In this embodiment, there are six program pads; however, it should be appreciated that the necessary number of program pads depends on the microcontroller model/brand being used. In the case of factory pre-programmed microcontrollers, the program pads are not needed at all. By way of a non-limiting example, the microcontroller can be provided to house the memory, the controller and the processor. The electronics components are in electrical communication among them via circuit tracks 18, with some of them in contact with the printer through the printer pads. The program pads 16*a*-16*f*, are in electrical communication with the processor (in this case the processor is shown at 12*f*; the other components are resistors, capacitors, diodes and transistors) via circuit tracks 18, with some of them being in contact with the printer pads 14*a*, 14*b*, only for program and test purposes (e.g., after testing, they have no purpose). The program pads 16*a*-16*f* are used to program the microchip 10 with specific data packets, as will be described herein. The printer pads 14*a*, 14*b*, are in electrical communication with the printer via the contacts formed thereon. The printer pads 14*a*, 14*b*, are used to establish an electrical connection with one or more electrical contacts formed on one or more surfaces of the printer.

Figure 2:
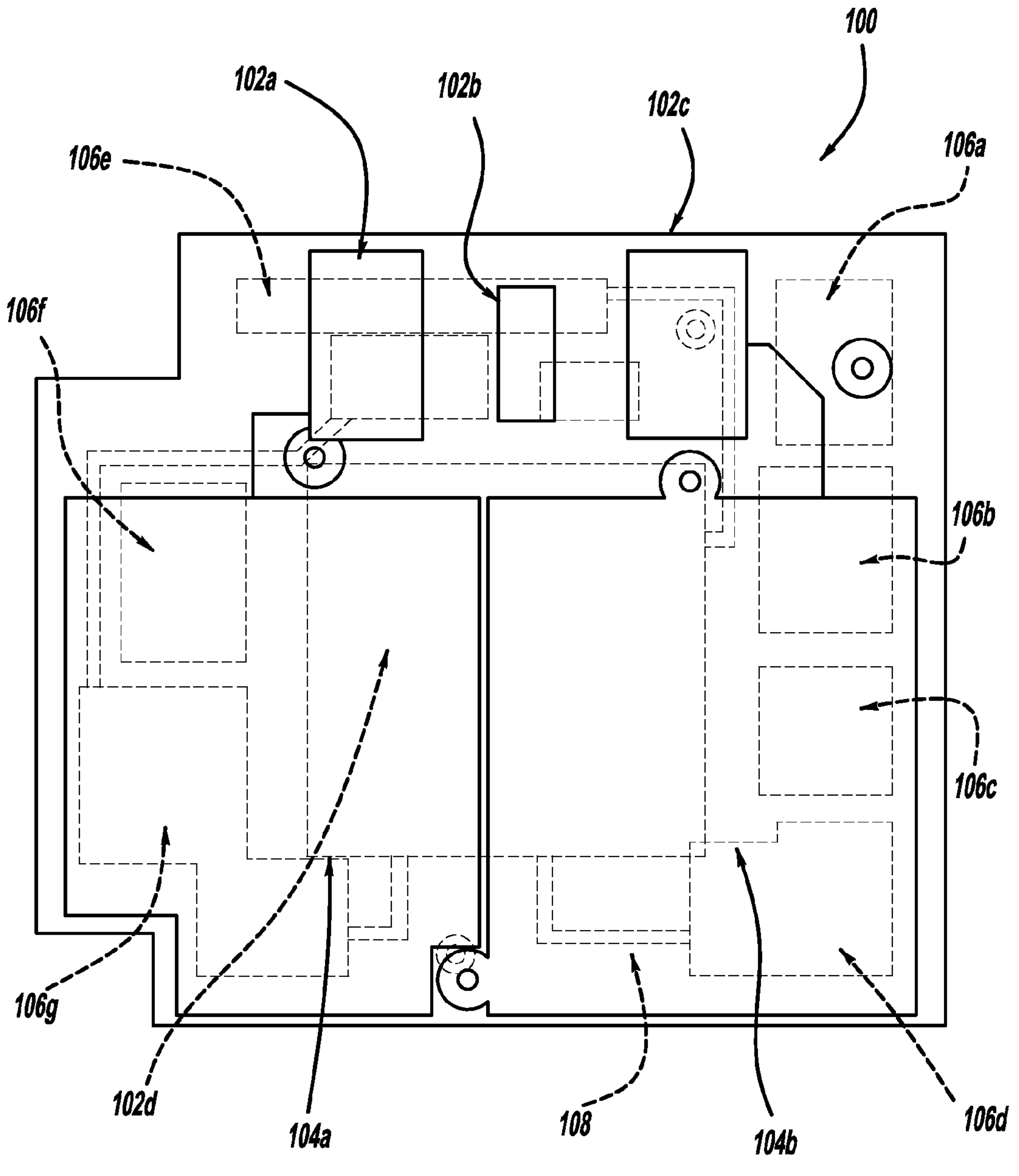
FIG. 2 is a schematic view of a printer cartridge microchip, in accordance with a second embodiment of the present invention.

Referring to FIG. 2, the 3G microchip, generally shown at 100, also generally includes a plurality of electronics components 102*a*-102*d* (e.g., input/output (I/O) interface circuitry, a controller, and/or the like), a pair of printer pads 104*a*, 104*b* (e.g., electrical contacts). In this embodiment, there are shown two printer pads; however, it should be appreciated that this number can be greater than this, e.g., 3 or 4. Also shown is a plurality of program pads 106*a*-106*g* (e.g., memory modules). The program pads are used to program the microcontroller. In this embodiment, there are six program pads; however, it should be appreciated that the necessary number of program pads depends on the microcontroller model/brand being used. In the case of factory pre-programmed microcontrollers, they are not needed at all. However, one or more of these components can be mounted on both major faces of a body (e.g., mounting plate). For example, those components mounted on the "rear" side of the microchip 10 are shown in dashed line format. By way of a non-limiting example, the program pads 106*a*-106*g* are mounted on a major face of the plate opposite most of the electronics components and the printer pads 104*a*, 104*b*. The electronics components 102*a*-102*d* are in electrical communication between them via circuit tracks 108, with some of them being in contact with the printer through the printer pads 104*a*, 104*b*. The program pads 106*a*-106*g* are in electrical communication with the processor (in this case the processor is shown at 102*d*; the other components are resistors, capacitors, diodes and transistors) via circuit tracks 108, with some of them being in contact with the printer pads 104*a*, 104*b*, only for program and test purposes (e.g., after testing, they have no purpose). The program pads 102*a*-102*g* are used to program the microchip 100 with specific data packets, as will be described herein. By way of a non-limiting example, the microcontroller can be provided to house the memory, the controller and the processor. The printer pads 104*a*, 104*b*, are in electrical communication with the printer via the contacts formed thereon. The printer pads 104*a*, 104*b*, are used to establish an electrical connection with one or more electrical contacts formed on one or more surfaces of the printer.

Figure 3:
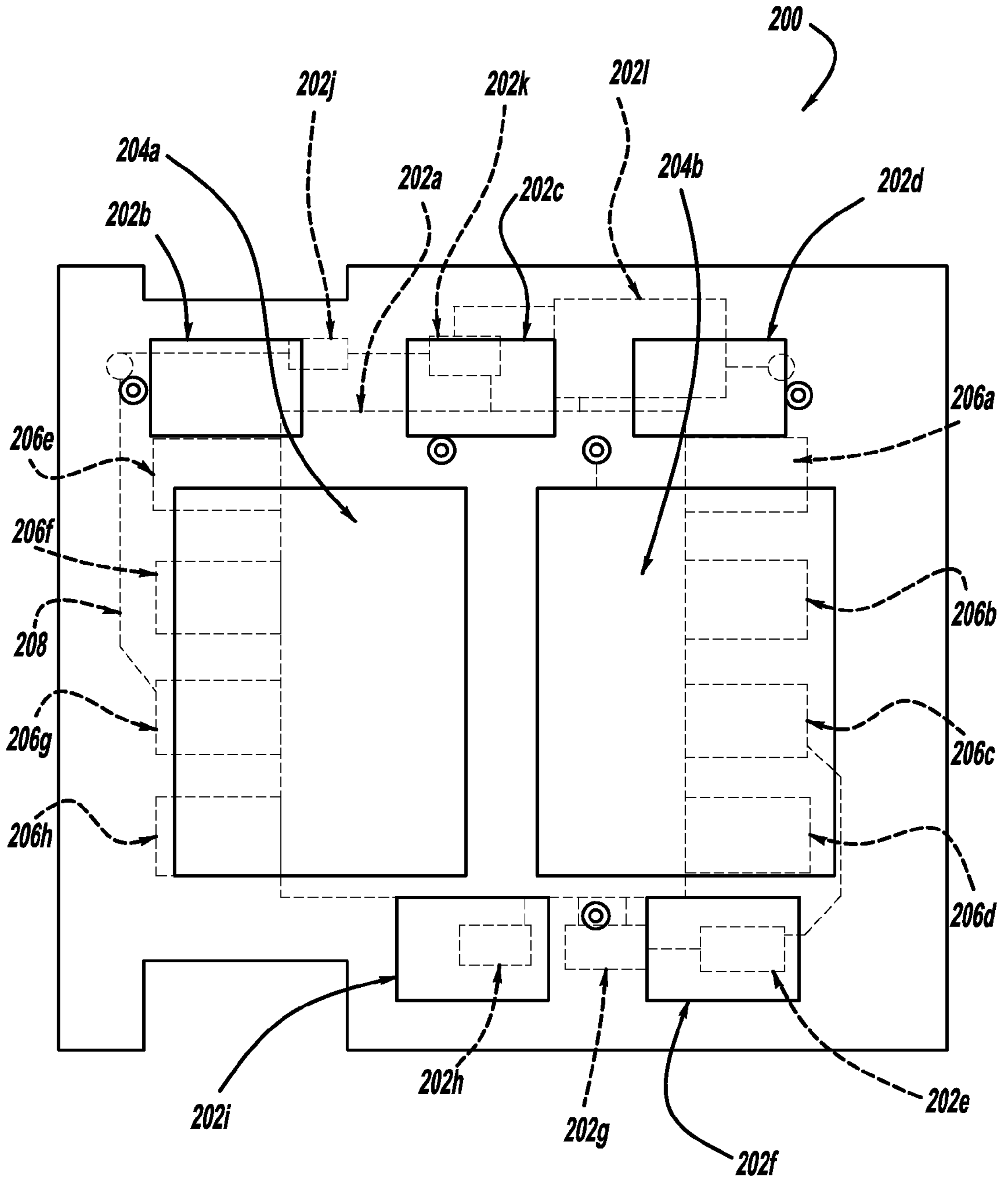
FIG. 3 is a schematic view of a printer cartridge microchip, in accordance with a third embodiment of the present invention.

Referring to FIG. 3, the 4G microchip, generally shown at 200, also generally includes a plurality of electronics components 202*a*-202*i* (e.g., input/output (I/O) interface circuitry, a controller, and/or the like) and a pair of printer pads 204*a*, 204*b*, (e.g., electrical contacts). Optionally, there can also be additional electronic components (202*j*-202*l*) that can be provided to make the circuit variable and that can be modified in different embodiments. In this embodiment, there are shown two printer pads; however, it should be appreciated that this number can be greater than this, e.g., 3 or 4. Also shown is a plurality of program pads 206*a*-206*h* (e.g., memory modules). The program pads are used to program the microcontroller. In this embodiment, there are six program pads; however, it should be appreciated that the necessary number of program pads depends on the microcontroller model/brand being used. In the case of factory pre-programmed microcontrollers, they are not needed at all. However, one or more of these components can be mounted on both major faces of a body (e.g., mounting plate). For example, the program pads 206*a*-206*g* are mounted on a major face of the plate opposite most of the electronics components and the printer pads 204*a*, 204*b*. By way of a non-limiting example, the microcontroller can be provided to house the memory, the controller and the processor. The electronics components 202*a*-202*i* are in electrical communication between them via circuit tracks 208 with some of them being in contact with the printer through the printer pads 204*a*, 204*b*. The program pads 206*a*-206*h* are in electrical communication with the processor (in this case the processor is shown at 202*a*; the other components are resistors, capacitors, diodes and transistors) via circuit tracks 208, with some of them being in contact with the printer pads 204*a*, 204*b*, only for program and test purposes (e.g., after testing, they have no purpose). The program pads 206*a*-206*h* are used to program the microchip 200 with specific data packets, as will be described herein. The printer pads 204*a*, 204*b*, are in electrical communication with the printer via the contacts formed thereon. The printer pads 204*a*, 204*b*, are used to establish an electrical connection with one or more electrical contacts formed on one or more surfaces of the printer.

Figure 4:
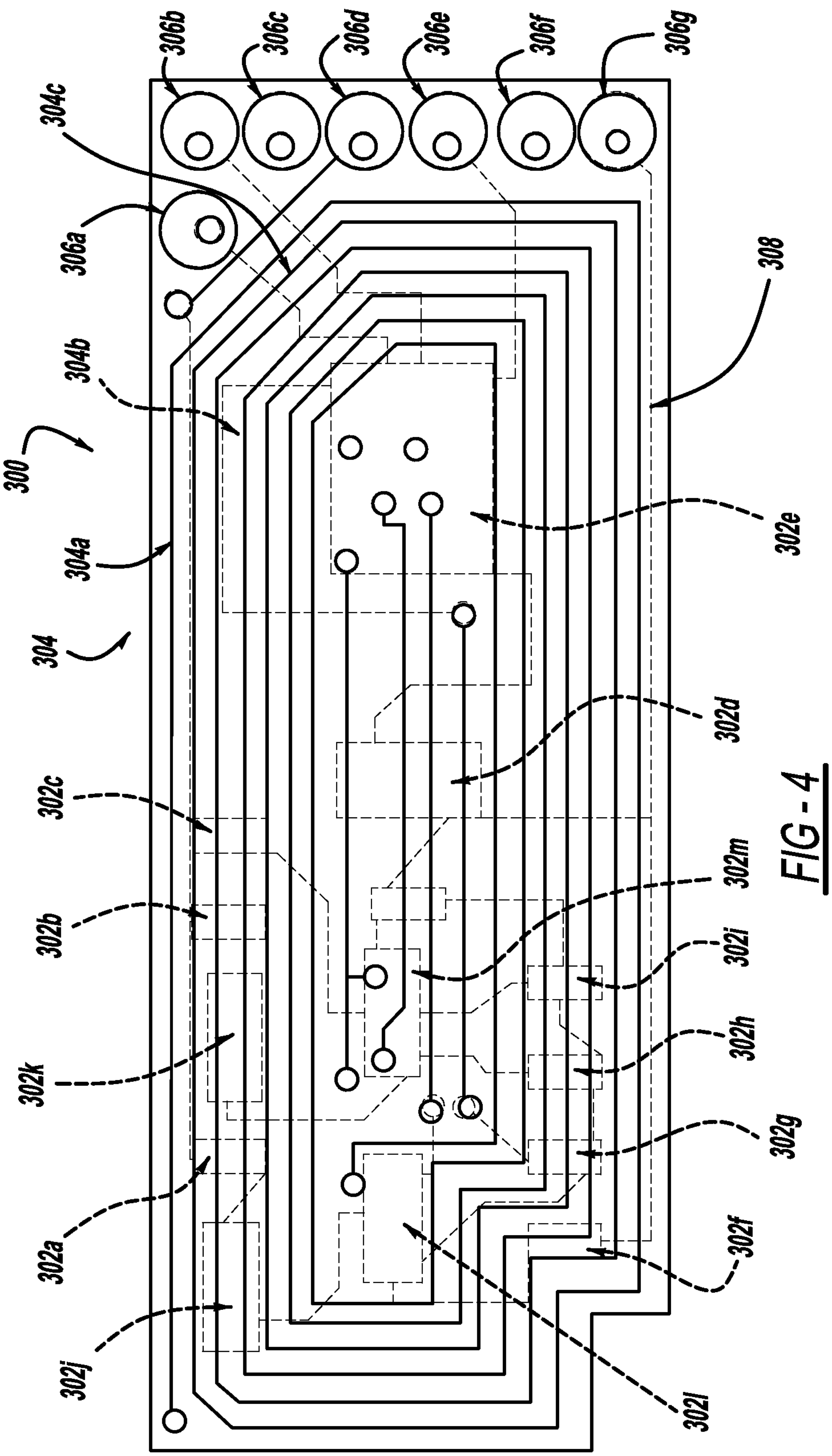
FIG. 4 is a schematic view of a printer cartridge microchip, in accordance with a fourth embodiment of the present invention.

Referring to FIG. 4, the RF microchip, generally shown at 300, also generally includes a plurality of electronics components 302*a*-302*m* (e.g., input/output (I/O) interface circuitry, a controller, and/or the like), an antenna system 304 (including antennas 304*a*, 304*b* and 304*c*) to communicate with the printer, and a plurality of program pads 306*a*-306*g* (e.g., memory modules). The program pads are used to program the microcontroller. In this embodiment, there are six program pads; however, it should be appreciated that the necessary number of program pads depends on the microcontroller model/brand being used. In the case of factory pre-programmed microcontrollers, they are not needed at all. However, one or more of these components can be mounted on both major faces of a body (e.g., a mounting plate). For example, the antenna 304 is formed in a series of interconnected layers in the opposite side of the electronics components 302*a*-302*m*. By way of a non-limiting example, the microcontroller can be provided to house the memory, the controller and the processor. The electronics components 302*a*-302*m* are in electrical communication, e.g., between them via circuit tracks 308 with some of them being in contact with the printer through the antenna 304 via radio frequency. The program pads 306*a*-306*g* are in electrical communication with the processor (in this case the processor is shown at 302*e*; the other components are resistors, capacitors, diodes and transistors) via circuit tracks 308, with some of them being in contact with the antenna 304 only for program and test purposes (e.g., after testing, they have no purpose). The program pads 302*a*-302*g* are used to program the microchip 300 with specific data packets, as will be described herein. The antenna 304 is in electrical communication with the printer via radio frequency, thus there is no need for printer pads. The antenna 304 is used to establish an electrical connection with the printer through another antenna installed in the printer.

These particular cartridge microchips are referred to as "multi-printer technology microchips" in that a single cartridge microchip may be compatible with more than one type of printer cartridge, which in turn may be compatible with more than one type of imaging device (e.g., printer). By "type," as that term is used herein, it is meant to include, without limitation, any model, family, group, and/or the like, of imaging devices.

In the case of the multi-printer technology cartridge microchips provided by the present invention, including those listed in Tables I, IIA, III and IV, they all share several common attributes, including a main body having an input/output (I/O) interface circuitry, a processor, a controller, and a memory module located thereon. By way of a non-limiting example, the memory modules of the multi-printer technology cartridge microchips can include 35 positions of 4 bytes each. Certain memory positions (e.g., those designated as 00, 01, and 02) can be fixed for each model of printer cartridge. The I/O interface circuitry is operably associated with the controller and provides the appropriate electronic circuitry for the controller to communicate with an imaging device (e.g., a printer). The controller controls the operation of the multi-printer technology cartridge microchip and provides a functional interface to the memory module, including controlling the reading of data from and the writing of data to the memory module by the printer. The basic communication paths between the printer and the multi-printer technology cartridge microchips of the present invention are presented in FIG. 5.

Prior to the first step, the printer 400 (which is assumed to have already been powered up or otherwise energized) is ready to begin initialization of the cartridge microchip 402 and the cartridge microchip 402 is ready to receive initialization (at 404) by the printer 400, thus no communication between the two devices has occurred at this point.

The first step 406 involves the commencement of the initialization of the cartridge microchip 402 by the printer 400. For example, this can entail the transmission of a 6 byte (or less than or more than this number of bytes) data frame (e.g., designated as T1) from the printer 400 (e.g., a computer or processor associated therewith) to the cartridge microchip 402. By "data frame," as that phrase is used herein, it is meant to include, without limitation, a basic unit of communication over a digital link. A data frame is also referred to as a datagram, a segment, a block, a cell, or a packet, depending on the protocol. The structure of a data frame depends on the type of data frame it is and on the protocol used. Typically, a data frame can include a "header," a "payload," and/or "padding." The same initialization data frame is used for all printers. The printer 400 waits (at 408) for acknowledgement by the cartridge microchip 402.

The second step 410 involves the acknowledgement and/or answer of the initialization step by the cartridge microchip 402 to the printer 400. For example, this could involve the transmission of a 16 byte (or less than or more than this number of bytes) data frame (e.g., designated as R1) from the cartridge microchip 402 to the printer 400.

The third step 412 involves the printer 400 acknowledging the cartridge microchip 402 answer with respect to the initialization and preparing to read the cartridge microchip 402 memory module. The cartridge microchip remains ready (at 414) to receive any command during this time.

The fourth step 416 involves the printer 400 reading the cartridge microchip 402 memory module. During this time, the printer would wait for the data to be read from the memory module (at 417). For example, this could involve the transmission of a 16 byte (or less than or more than this number of bytes) data frame (e.g., designated as T2) that is capable of reading the cartridge microchip 402 memory module. The T2 data frame can include a 6 byte (or less than or more than this number of bytes) header that is identical for all printers and a 10 byte (or less than or more than this number of bytes) padding that should match with the 00, 01, and 02 positions for proper cartridge microchip 402 memory function.

The fifth step 418 involves the cartridge microchip 402 acknowledging the printer 400 read command and setting the proper cartridge microchip 402 memory function. For example, this could involve the transmission of a 19 byte (or less than or more than this number of bytes) data frame (e.g., designated as R2) from the cartridge microchip 402 to the printer 400.

The sixth step 420 involves the printer 400 acknowledging the cartridge microchip 402 data and preparing to write to the microchip memory module. The cartridge microchip 402 remains ready (at 422) to receive any command during this time.

The seventh step 424 involves the printer 400 writing to the memory module of the cartridge microchip 402. For example, this could involve the transmission of a 22 byte (or less than or more than this number of bytes) data frame (e.g., designated as T3) that is capable of writing to the cartridge microchip 402 memory module. The T3 data frame can include a 6 byte (or less than or more than this number of bytes) header that is identical for all printers and a 16 byte (or less than or more than this number of bytes) padding that should match with the 00, 01, and 02 positions for proper cartridge microchip 402 memory function. The printer 400 waits (at 426) for acknowledgement by the cartridge microchip 402.

The eighth step 428 involves acknowledgement by the cartridge microchip 402 of the printer 400 write command. At this point, the cartridge microchip 402 is in lock memory mode.

The ninth step 430 involves the transmission of an answer by the cartridge microchip 402 to the printer 400 that the writing process to the cartridge microchip 402 memory module has been completed.

The tenth step 432 involves the acknowledgement by the printer 400 of the answer received from the cartridge microchip 402. The cartridge microchip 402 will answer proper data only for "locked" cartridge microchip 402 memory from this point forward.

In the case of the multi-printer technology cartridge microchips listed in Tables IIB and IIC, they essentially function in the same manner as described above; however, they only differ from the other cartridges microchips in size, memory structure, as well as data frame sequence. Otherwise, the functions of the two groups of cartridge microchips, as outlined above, are essentially identical.

At no time during the previously described process, or any time subsequent thereto, do the multi-printer technology cartridge microchips of the present invention determine which specific printer model or printer cartridge it is interfacing with. Even if the printer or printer cartridge did transmit data or information to the cartridge microchip indicating the specific printer model or printer cartridge, the cartridge microchip would be unable and/or incapable of receiving, processing and/or understanding this data or information. Also, at no time during the previously described process, or any time subsequent thereto, does the cartridge microchip transmit to the printer or printer cartridge any information that would indicate that the cartridge microchip has awareness as to which specific printer model or printer cartridge it is interfacing with. The communications between the printer or printer cartridge and the cartridge microchip are limited to specific data frame exchanges which do not contain any specific printer model or printer cartridge information. Thus, the multi-printer technology cartridge microchips of the present invention never have any awareness or recognition of what specific printer model or printer cartridge they are functioning with.

Figure 6:
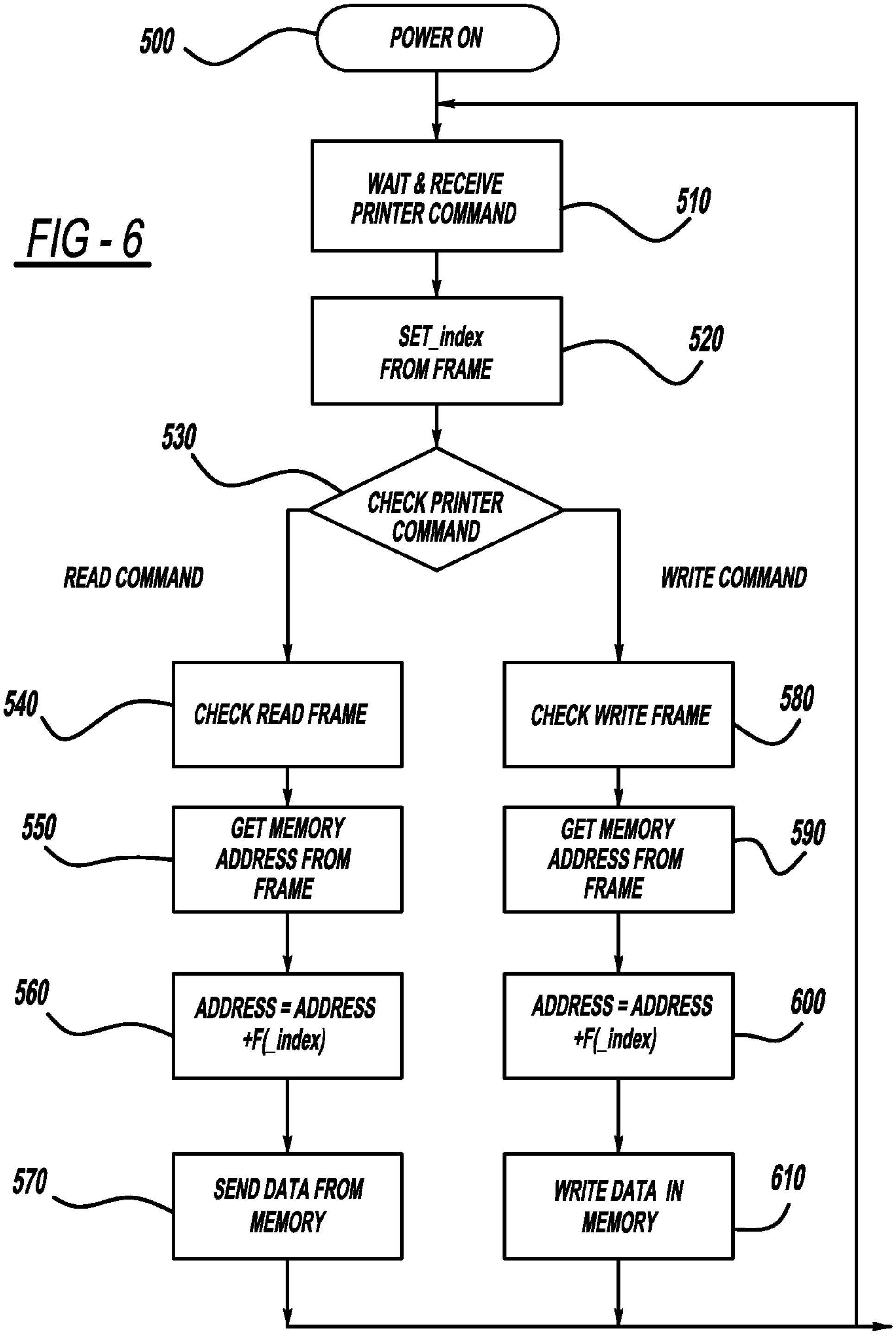
FIG. 6 is a flowchart of an alternative communication pathway between a printer and a printer cartridge microchip, in accordance with a sixth embodiment of the present invention.

An alternative way of expressing the basic communication paths between the printer and the multi-printer technology cartridge microchips of the present invention is presented in FIG. 6.

At step 500, the printer is powered up or otherwise energized. At step 510, the cartridge microchip is waiting to receive a command from the printer (e.g., as part of the initialization process). The received command can entail the transmission of a 6 byte (or less than or more than this number of bytes) data frame (e.g., designated as T1) from the printer (e.g., a computer or processor associated therewith) to the cartridge microchip. By "data frame," as that phrase is used herein, it is meant to include, without limitation, a basic unit of communication over a digital link. A data frame is also referred to as a datagram, a segment, a block, a cell, or a packet, depending on the protocol. The structure of a data frame depends on the type of data frame it is and on the protocol used. Typically, a data frame can include a "header," a "payload," and/or "padding."

At step 520, the cartridge microchip then sets an index (e.g., a variable that takes its value from the printer command) from the received data frame. At step 530, the cartridge microchip checks the received printer command to determine whether it is a "read" command or a "write" command.

If the received command is a read command, the cartridge microchip checks the read data frame of the command, at step 540. At step 550, the cartridge microchip gets the memory address from the data frame. Then, at step 560, the memory address is determined by the cartridge microchip by the algorithm ADDRESS=ADDRESS+f(_index), wherein f(_index) is a function that uses _index (as noted above, a variable that takes its value from the printer command). Finally, at step 570, the cartridge microchip sends data from its memory to the printer, whereupon the cartridge microchip will await another command (e.g., either another read or a write command) from the printer.

If the received command is a write command, the cartridge microchip checks the write data frame of the command, at step 580. At step 590, the cartridge microchip gets the memory address from the data frame. Then, at step 600, the memory address is determined by the cartridge microchip by the algorithm ADDRESS=ADDRESS+f(_index), wherein f(_index) is a function that uses _index (as noted above, a variable that takes its value from the printer command). Finally, at step 610, data is written into the memory of the cartridge microchip. While the cartridge microchip can receive another command (e.g., either another read or a write command) from the printer, it can not be initialized by another different printer (e.g., one that uses or requires different data frames) after this step.

Figure 5:
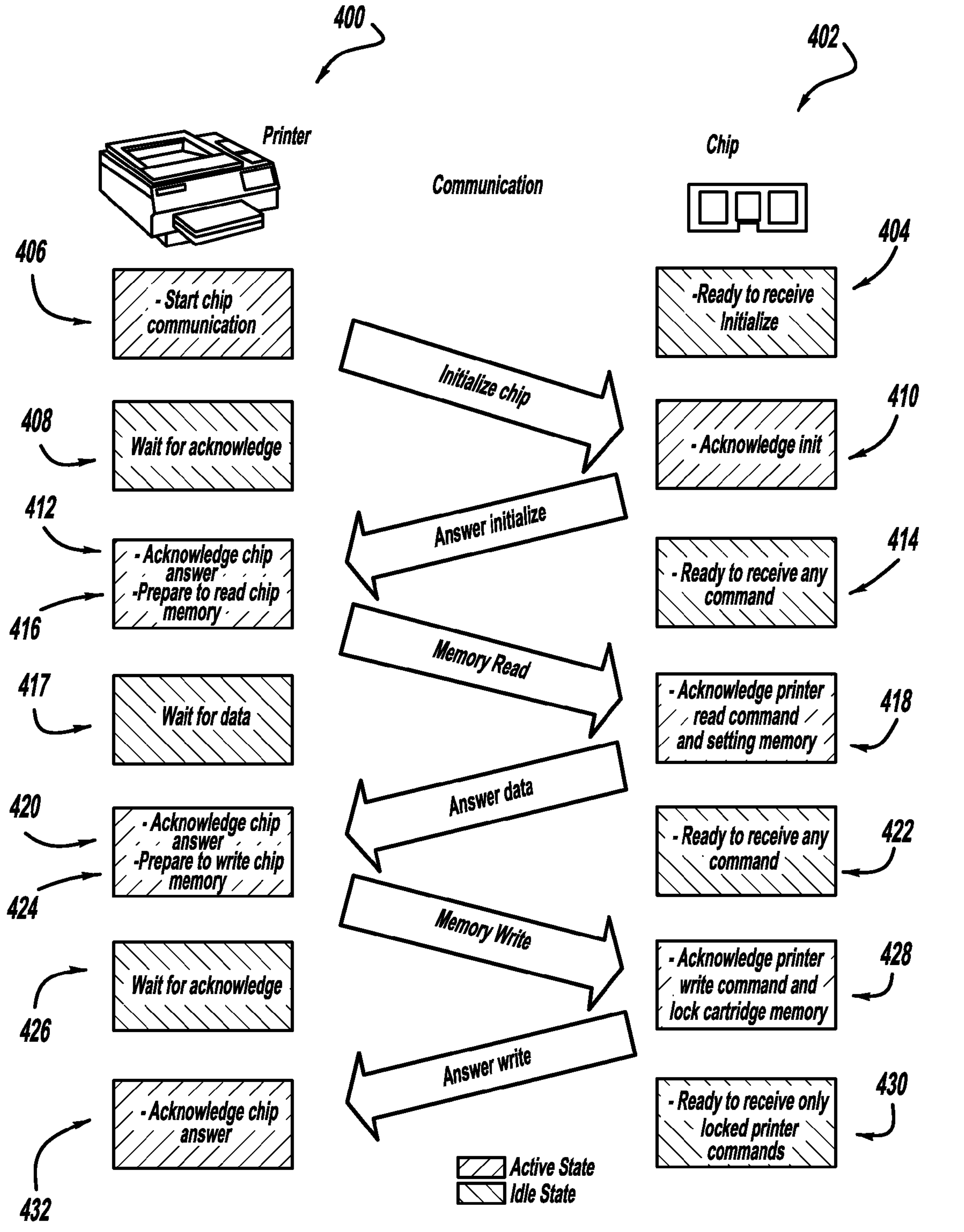
FIG. 5 is a flowchart of a communication pathway between a printer and a printer cartridge microchip, in accordance with a fifth embodiment of the present invention.

Again, as with the flowchart depicted in FIG. 5, at no time during the previously described process, or any time subsequent thereto, do the multi-printer technology cartridge microchips of the present invention determine which specific printer model or printer cartridge it is interfacing with. Even if the printer or printer cartridge did transmit data or information to the cartridge microchip indicating the specific printer model or printer cartridge, the cartridge microchip would be unable and/or incapable of receiving, processing and/or understanding this data or information. Also, at no time during the previously described process, or any time subsequent thereto, does the cartridge microchip transmit to the printer or printer cartridge any information that would indicate that the cartridge microchip has awareness as to which specific printer model or printer cartridge it is interfacing with. The communications between the printer or printer cartridge and the cartridge microchip are limited to specific data frame exchanges which do not contain any specific printer model or printer cartridge information. Thus, the multi-printer technology cartridge microchips of the present invention never have any awareness or recognition of what specific printer model or printer cartridge they are functioning with.

By way of a non-limiting example, several cartridge microchips can be used with printer cartridges that can be used in conjunction with several different models of HP or other types of laser printers. For example, with respect to the HP laser printer family, it includes four general types, i.e., monochromatic contact, color contact, monochromatic radio frequency ("RF"), and color RF. Within each of these four types, at least one cartridge microchip can be used with at least one specific type of printer model of that type.

With respect to the monochromatic contact type HP laser printers, the present invention provides several cartridge microchips that are compatible with printer cartridges that can function with the following HP laser printers, as set forth in Table I, below:

TABLE I

| Present Invention's Cartridge Microchip Part Number | HP Printer Model |
|---|---|
| UMTLY | Black cartridges for low yield multi-function printers: HP 1160, HP 1300, HP 1320, HP 2300, HP 2410, HP 2420, HP 2430, HP 3390, HP 3392, HP 4200, HP 4300, HP 4250, HP 4350, HP 4345 |
| UMTHY | Black cartridges for high yield multi-function printers: HP 1300, HP 1320, HP 2300, HP 2410, HP 2420, HP 2430, HP 3390, HP 3392, HP 4200, HP 4300, HP 4250, HP 4350, HP 4345 |
| UMT2LY | Black cartridges for low yield multi-function printers: HP P 3005, HP M 3027 MFP, HP M 3035 MFP, HP P 2015, HP 1160, HP 1320, HP 2410, HP 2420, HP 2430 |

TABLE I-continued

| Present Invention's Cartridge Microchip Part Number | HP Printer Model |
|---|---|
| UMT2HY | Black cartridges for high yield multi-function printers: HP P 3005, HP M 3027 MFP, HP M 3035 MFP, HP P 2015, HP 1160, HP 1320, HP 2410, HP 2420, HP 2430 |
| UMT3LY | Black cartridges for low yield multi-function printers: HP 1160, HP 1300, HP 1320, HP P 2015, HP 2300, HP 2410, HP 2420, HP 2430, HP P 3005, HP M 3027 MFP, HP M 3035 MFP, HP 3390, HP 3392, HP 4200, HP 4300, HP 4250, HP 4350, HP 4345 |
| UMT3HY | Black cartridges for high yield multi-function printers: HP 1160, HP 1300, HP 1320, HP P 2015, HP 2300, HP 2410, HP 2420, HP 2430, HP P 3005, HP M 3027 MFP, HP M 3035 MFP, HP 3390, HP 3392, HP 4200, HP 4300, HP 4250, HP 4350, HP 4345 |

With respect to certain color contact type HP laser printers, the present invention provides several cartridge microchips that are compatible with printer cartridges that can function with the following HP laser printers, as set forth in Table IIA, below:

TABLE IIA

| Present Invention's Cartridge Microchip Part Number | HP Printer Model |
|---|---|
| MTBBB | Black cartridges for: HP 1500, HP 2500, HP 2550, HP 2820, HP 2840, HP 3500, HP 3700 |
| MTCM500M | Cyan/Magenta/Yellow ("CMY") cartridges for: HP 1500, HP 2500<br>Cyan/Magenta/Yellow ("CMY") high yield cartridges for: HP 2550, HP 2820, HP 2840<br>Magenta cartridges for: HP 3500, HP 3550 |
| MTCM700M | CMY cartridges for: HP 1500, HP 2500<br>CMY high yield cartridges for: HP 2550, HP 2820, HP 2840<br>Magenta cartridges for: HP 3700 |
| MTCL500C | CMY cartridges for: HP 1500, HP 2500<br>CMY low yield cartridges for: HP 2550, HP 2820, HP 2840<br>Cyan cartridges for: HP 3500, HP 3550 |
| MTCL700C | CMY cartridges for: HP 1500, HP 2500<br>CMY low yield cartridges for: HP 2550, HP 2820, HP 2840<br>Cyan cartridges for: HP 3700 |
| MTDD500Y | Drum cartridges for: HP 1500, HP 2500, HP 2550, HP 2820, HP 2840<br>Yellow cartridges for: HP 3500, HP 3550 |
| MTDD700Y | Drum cartridges for: HP 1500, HP 2500, HP 2550, HP 2820, HP 2840<br>Yellow cartridges for: HP 3700 |

With respect to other color contact type HP laser printers, the present invention provides several cartridge microchips that are compatible with printer cartridges that can function with the following HP/Canon laser printers, as set forth in Table IIB, below:

TABLE IIB

| Present Invention's Cartridge Microchip Part Number | HP Printer Model |
|---|---|
| MT3G1B | Black cartridges for: CM 1015, CM 1017, HP 1600, HP 2600/Canon LBP 5000, HP 2605, HP 3000, HP 3600, HP 3800, HP 4700, HP 3505 |
| MT3G1C | Cyan cartridges for: CM 1015, CM 1017, HP 1600, HP 2600/Canon LBP 5000, HP 2605, HP 3000, HP 3600, HP 4700 |
| MT3G1V1B | Black cartridges for: CM 1015, CM 1017, HP 1600, HP 2600/CANON LBP 5000, HP 2605, HP 3000, HP 3600, HP 3800, HP 3505, HP 4700, HP 4730, HP 5200, HP 5025, HP 5035 |
| MT3G1V1C | Cyan cartridges for: CM 1015, CM 1017, HP 1600, HP 2600/Canon LBP 5000, HP 2605, HP 3000, HP 3600, HP 4700, HP 4730, HP 5200, HP 5025, HP 5035 |
| MT3G1M | Magenta cartridges for: CM 1015, CM 1017, HP 1600, HP 2600/Canon LBP 5000, HP 2605, HP 3000, HP 3600, HP 4700 |
| MT3G1V1M | Magenta cartridges for: CM 1015, CM 1017, HP 1600, HP 2600/Canon LBP 5000, HP 2605, HP 3000, HP 3600, HP 4700, HP 4730, HP 5200, HP 5025, HP 5035 |
| MT3G1Y | Yellow cartridges for: CM 1015, CM 1017, HP 1600, HP 2600, HP 2605, HP 3000, HP 3600, HP 4700 |
| MT3G1V1Y | Yellow cartridges for: CM 1015, CM 1017, HP 1600, HP 2600/Canon LBP 5000, HP 2605, HP 3000, HP 3600, HP 4700, HP 4730, HP 5200, HP 5025, HP 5035 |
| MT3G2C | Cyan cartridges for: CM 1015, CM 1017, HP 1600, HP 2600, HP 2605, HP 3000, HP 3505, HP 3800, HP 4700 |
| MT3G2V1C | Cyan cartridges for: CM 1015, CM 1017, HP 1600, HP 2600/Canon LBP 5000, HP 2605, HP 3000, HP 3800, HP 4700, HP 4730, HP 3505, HP 5200, HP 5025, HP 5035 |
| MT3G2M | Magenta cartridges for: CM 1015, CM 1017, HP 1600, HP 2600, HP 2605, HP 3000, HP 3505, HP 3800, HP 4700 |
| MT3G2V1M | Magenta cartridges for: CM 1015, CM 1017, HP 1600, HP 2600/Canon LBP 5000, HP 2605, HP 3000, HP 3800, HP 4700, HP 4730, HP 3505, HP 5200, HP 5025, HP 5035 |
| MT3G2Y | Yellow cartridges for: CM 1015, CM 1017, HP 1600, HP 2600, HP 2605, HP 3000, HP 3505, HP 3800, HP 4700 |
| MT3G2V1Y | Yellow cartridges for: CM 1015, CM 1017, HP 1600, HP 2600/Canon LBP 5000, HP 2605, HP 3000, HP 3800, HP 4700, HP 4730, HP 3505, HP 5200, HP 5025, HP 5035 |
| MT3G3V1B | Black cartridges for: CM 1015, CM 1017, HP 1600, HP 2600/Canon LBP 5000, HP 2605, HP 3000, HP 3505, HP 3600, HP 3800, HP 4005, HP 4730, HP 5200, HP 5025, HP 5035 |
| MT3G3V1C | Cyan cartridges for: CM 1015, CM 1017, HP 1600, HP 2600/Canon LBP 5000, HP 2605, HP 3000, HP 3600, HP 4005, HP 4730, HP 5200, HP 5025, HP 5035 |

TABLE IIB-continued

| Present Invention's Cartridge Microchip Part Number | HP Printer Model |
|---|---|
| MT3G3V1M | Magenta cartridges for: CM 1015, CM 1017, HP 1600, HP 2600/Canon LBP 5000, HP 2605, HP 3000, HP 3600, HP 4005, HP 4730, HP 5200, HP 5025, HP 5035 |
| MT3G3V1Y | Yellow cartridges for: CM 1015, CM 1017, HP 1600, HP 2600/Canon LBP 5000, HP 2605, HP 3000, HP 3600, HP 4005, HP 4730, HP 5200, HP 5025, HP 5035 |

With respect to still other color contact type HP laser printers, the present invention provides several cartridge microchips that are compatible with printer cartridges that can function with the following HP laser printers, as set forth in Table IIC, below:

TABLE IIC

| Present Invention's Cartridge Microchip Part Number | HP Printer Model |
|---|---|
| MT4GBHY | Black high yield cartridges for: P1005, P1006, P1007, P1008, P1505, M1522, M1120, P4015, P4515, P2055, CP1215, CP1515, CP1518, CM1312 MFP, CP2025, CM2320 MFP, CP3525, CM3530 MFP |
| MT4GCHY | Black high yield and Cyan cartridges for: P1005, P1006, P1007, P1008, P1505, M1522, M1120, P4015, P4515, P2055, CP1215, CP1515, CP1518, CM1312 MFP, CP2025, CM2320 MFP, CP3525, CM3530 MFP |
| MT4GMLY | Black low yield and Magenta cartridges for: P1005, P1006, P1007, P1008, P1505, M1522, M1120, P4014, P4015, P4515, P2035, P2055, CP1215, CP1515, CP1518, CM1312 MFP, CP2025, CM2320 MFP, CP3525, CM3530 MFP |
| MT4GYLY | Black low yield and Yellow cartridges for: P1005, P1006, P1007, P1008, P1505, M1522, M1120, P4014, P4015, P4515, P2035, P2055, CP1215, CP1515, CP1518, CM1312 MFP, CP2025, CM2320 MFP, CP3525, CM3530 MFP |
| MT4GBLY | Black low yield cartridges for: P1005, P1006, P1007, P1008, P1505, M1522, M1120, P4014, P4015, P4515, P2035, P2055, CP1215, CP1515, CP1518, CM1312 MFP, CP2025, CM2320 MFP, CP3525, CM3530 MFP |
| MT4GMONOHY | Black high yield cartridges for: P1005, P1006, P1007, P1008, P1505, M1522, M1120, P4015, P4515, P2055, P3015 |
| MT4GMONOLY | Black low yield cartridges for: P1005, P1006, P1007, P1008, P1505, M1522, M1120, P4014, P4015, P4515, P2035, P2055, P3015 |

With respect to the monochromatic RF type HP laser printers, the present invention provides one cartridge microchip that is compatible with printer cartridges that can function with the following HP laser printers, as set forth in Table III, below:

TABLE III

| Present Invention's Cartridge Microchip Part Number | HP Printer Model |
|---|---|
| MTRFMONOC | HP 4100, HP 9000, HP 9040, HP 9050 |

With respect to the color RF type HP laser printers (as well as select color RF type Canon laser printers), the present invention provides several cartridge microchips that are compatible with printer cartridges that can function with the following HP/Canon laser printers, as set forth in Table IV, below:

TABLE IV

| Present Invention's Cartridge Microchip Part Number | HP Printer Model |
|---|---|
| MTRFBLACK | Black cartridges for: HP4600, HP4650, HP5500, HP5550 Black cartridges for Canon: EP-85, EP-86 |
| MTRFCYAN | Cyan cartridges for: HP4600, HP4650, HP5500, HP5550 Cyan cartridges for Canon: EP-85, EP-86 |
| MTRFMAG | Magenta cartridges for: HP4600, HP4650, HP5500, HP5550 Magenta cartridges for Canon: EP-85, EP-86 |
| MTRFYELL | Yellow cartridges for: HP4600, HP4650, HP5500, HP5550 Yellow cartridges for Canon: EP-85, EP-86 |

As previously noted, the microchips of the present invention, when they are new, can be used in a number of different printer models because each particular printer has a unique set of commands for which these microchips have unique sets of answers. In other words, each microchip has stored thereon all the possible responses for each possible command sent by each model of printer. Because the amount of memory available on the microchip controller is limited, an optimization method is used to minimize the amount of read/write memory needed. This method optimizes the amount of read/write memory needed (e.g., by using read/write and read memory). More specifically, this method includes a base map of data, that can be changed as the printer sends write commands, and a fixed XOR mask map (see an explanation of XOR function below).

Figure 7:
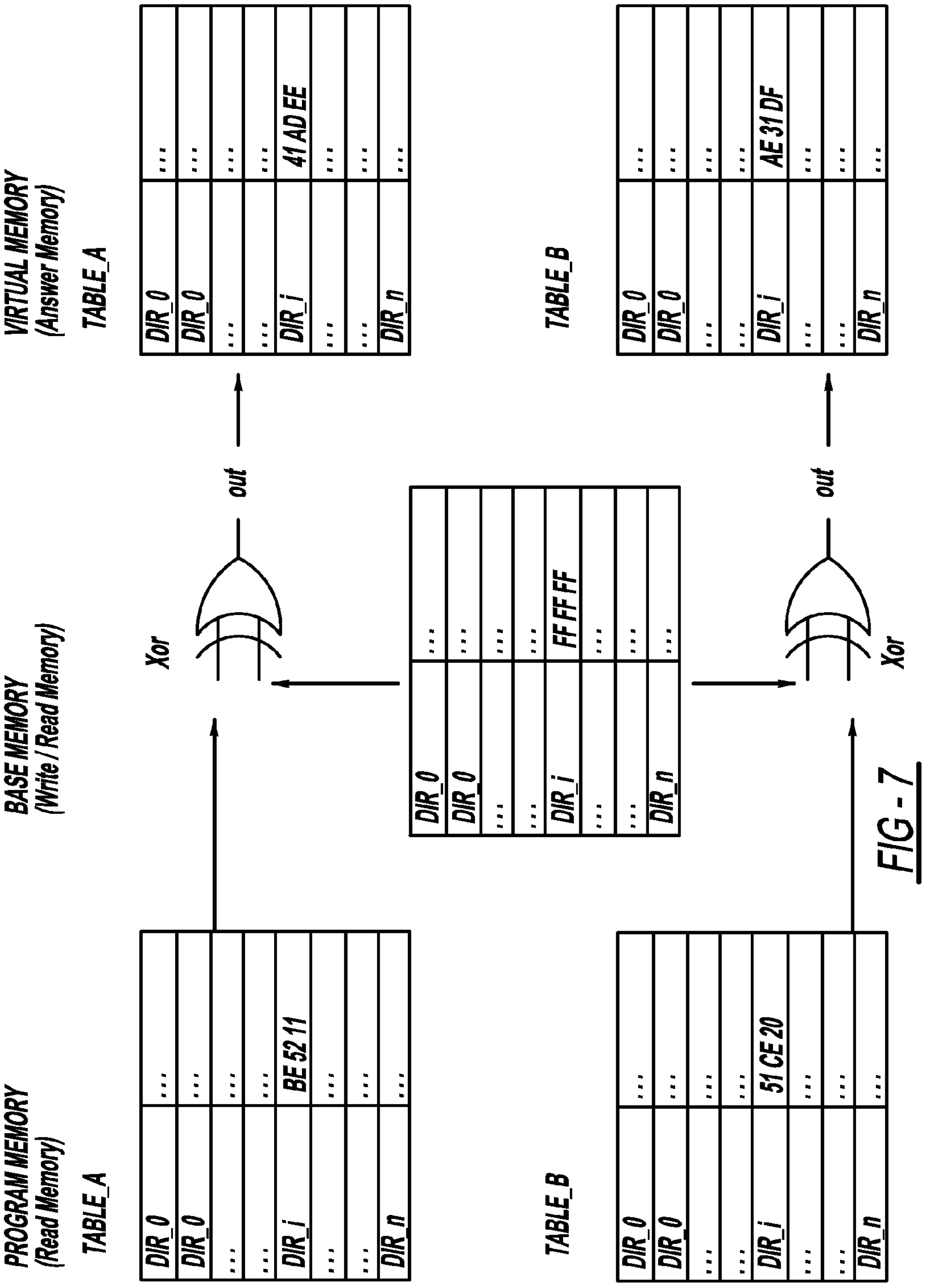
FIG. 7 is a schematic view of a memory element of a printer cartridge microchip prior to receiving a write command, in accordance with a seventh embodiment of the present invention.
Figure 8:
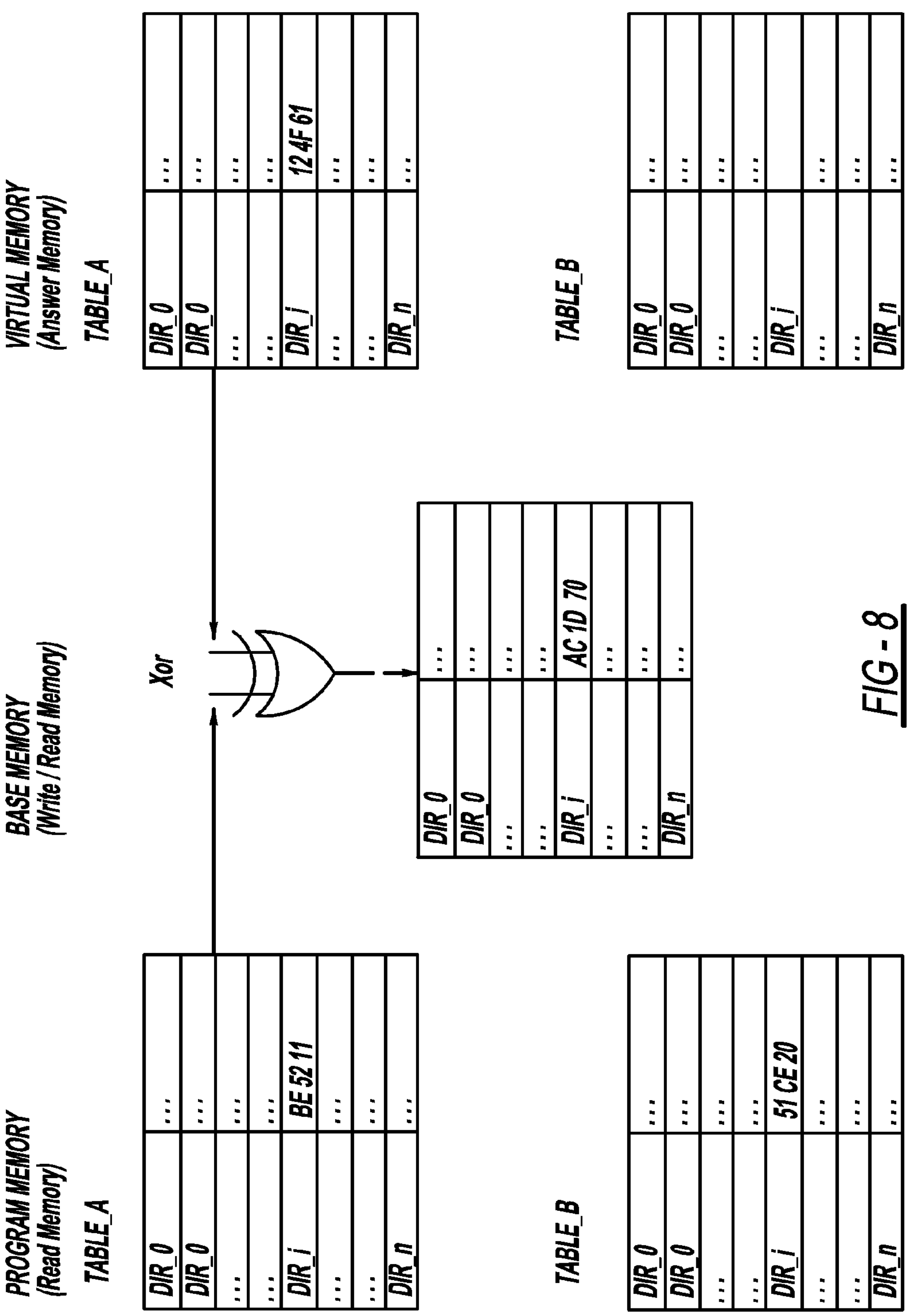
FIG. 8 is a schematic view of the memory element depicted in FIG. 7 receiving a write command, in accordance with an eighth embodiment of the present invention.
Figure 9:
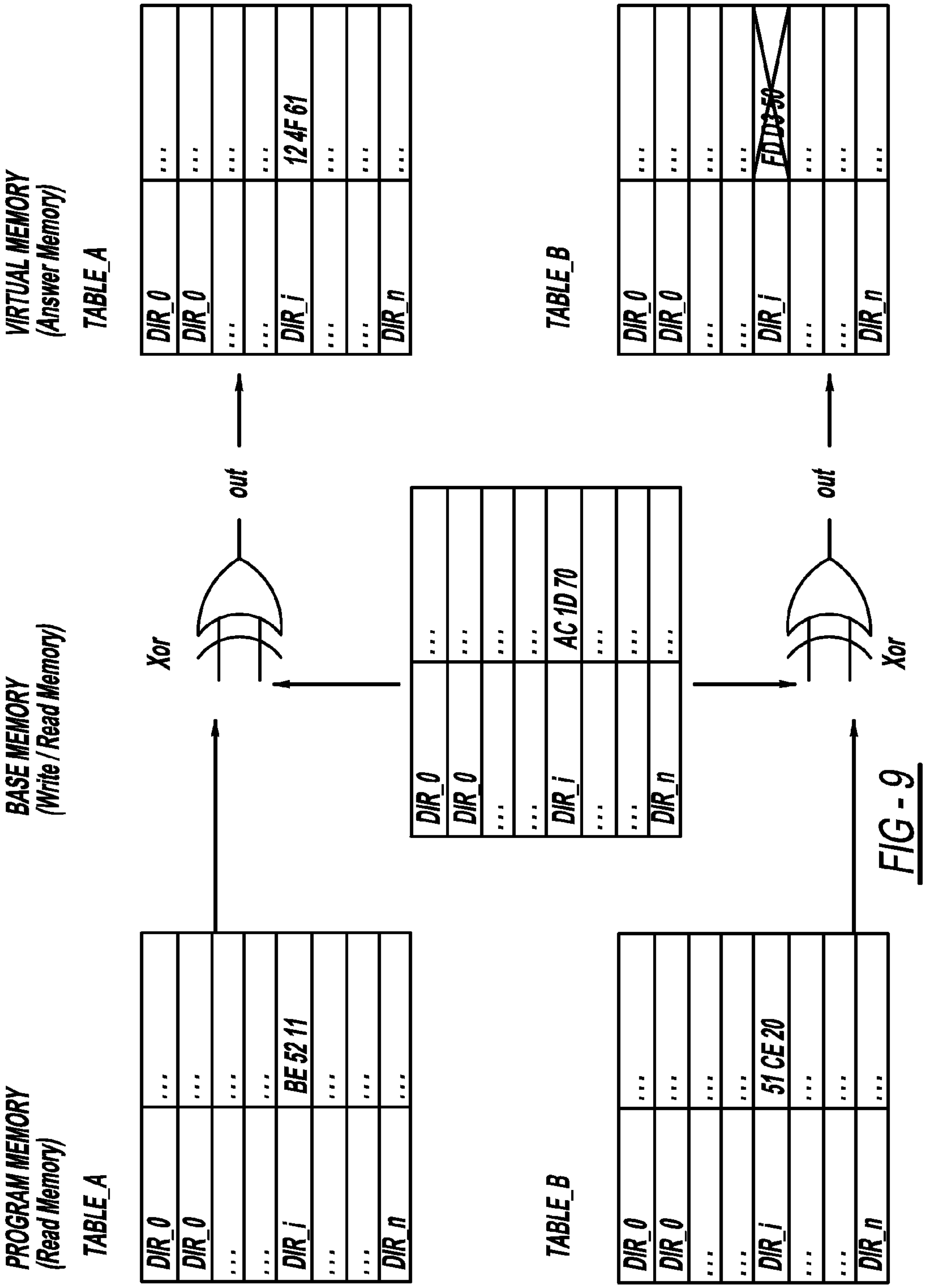
FIG. 9 is a schematic view of the memory element depicted in FIG. 8 after having received a write command, in accordance with a ninth embodiment of the present invention.

By way of a non-limiting example, the memory of the microchip includes both read-only and writable (and/or read-writable) memory subunits that are separate and distinct from one another (e.g., see FIGS. 7-9). For example, the read-only memory subunit can include a data frame corresponding to only a portion of an operational requirement of at least one imaging device. The writable memory subunit can include a data frame corresponding to a remainder of the portion of the operational requirement of at least one imaging device. In this manner, the relatively "smaller" memory of the read/write memory subunit (e.g., the base memory) can emulate a relatively "larger" read/write memory subunit (e.g., the virtual memory) by employing the read memory subunit (e.g., the program memory).

By way of another non-limiting example, a plurality of distinct and separate read-only memory subunits are provided. Like the previous example, the plurality of read-only memory subunits include data frames corresponding to only a portion of an operational requirement of a plurality of imaging devices. The writable memory subunit, which is also separate and distinct from the read-only memory subunits, includes a data frame corresponding to a remainder of the portion of the operational requirement of the plurality of imaging devices.

For each particular set of read/write commands sent by the printer, there is a specific XOR mask that generates the correct data+checksum response. The consequence of using this method is that when the printer sends a WRITE command that changes data in the base map using a particular XOR mask, that particular data, when is read back by the printer will be valid only if the read command corresponds to the same XOR mask.

To clarify this concept, consider an example wherein there are two sets of commands, COMM A and COMM B, both with a read and write command.

Referring to FIG. 7, suppose that the READ_A command of a particular map address has to be 0x41ADEE (see below for a discussion of hexadecimal notation), where, for example, 0x41AD is the data and 0xEE is the checksum (0x41+0xAD) that the printer uses to validate data. For the same map address, a READ_B command needs to read back, for example, 0xAE31DF. If we assume an initial value in the base map of 0xFFFFFF, for example, the XOR masks that the microcontroller has to use to give a correct answer to both commands are, for example:

MASK A=0xBE5211=>0xFFFFFF XOR 0xBE5211=0x41ADEE; and

MASK B=0x51CE20=>0xFFFFFF XOR 0x51CE20=0xAE31DF.

In this way, using only one base map in a data flash memory inside the microcontroller, which is a limited resource, and several fixed XOR masks inside the program memory, which is also a limited resource (but bigger that the data flash memory), the microchip is able to respond to many sets of read commands, and consequently can interface with several different printers models. This is true until the printer sends a write command (e.g., see FIG. 8). Consider the following example in Table V, below:

TABLE V

| Command | Data from printer | Data to write in base memory |
|---|---|---|
| WRITE_A | 0x124F61 | 0x124F61<br>XOR 0xBE5211 =<br>0xAC1D70 |
| WRITE_B | 0x124F61 | 0x124F61<br>XOR 0x51CE20 =<br>0x438141 |

Referring to FIG. 9, if after a WRITE_A command, the microchip receives a READ_A command, the correct response will be 0xAC1D70 XOR 0xBE5211=0x124F61, wherein 0x124F is the data and 0x61 is the checksum (i.e., 0x12+0x4F=0x61). The problem is when after a WRITE_A command, the microchip receives a READ_B command, in that case 0xAC1D70 XOR 0x51CE20=0xFDD350, wherein 0x50 is not the correct checksum for 0xFDD3, which makes the printer not recognize the cartridge microchip as a valid one. In summary, the microchips of the present invention continue to work for any of the subset commands (e.g., A, B, C, etc.) until new data is written with a specific subset, after which, the microchips are still capable of receiving, processing and/or understanding data/commands from any subset, but the correct data is available for the subset that previously modified the base map.

Accordingly, there is not a “different” HP microchip for each HP printer model, but rather there is only one, with only one group of commands that each printer model uses only in a small part. That is, each printer model uses only a subset of the complete set of commands that the particular microchip has.

By way of a non-limiting example, in order to emulate the original HP microchip with a commercial microcontroller, the XOR mask method was implemented, which caused the limitations in its operation explained before.

With respect to hexadecimal notation used in conjunction with the present invention, hexadecimal (also base-16, hexa, or hex) is a numeral system with a radix, or base, of 16. It uses sixteen distinct symbols, most often the symbols 0-9 to represent values zero to nine, and A, B, C, D, E, F (or a through f) to represent values ten to fifteen.

Its primary use is as a human friendly representation of binary coded values, so it is often used in digital electronics and computer engineering. Because each hexadecimal digit represents four binary digits (bits)—also called a nibble—it is a compact and easily translated shorthand to express values in base two, as shown in Table VI, below:

TABLE VI

| Decimal | Binary | Hexadecimal |
|---|---|---|
| 0 | 0000 | 0 |
| 1 | 0001 | 1 |
| 2 | 0010 | 2 |
| 3 | 0011 | 3 |
| 4 | 0100 | 4 |
| 5 | 0101 | 5 |
| 6 | 0110 | 6 |
| 7 | 0111 | 7 |
| 8 | 1000 | 8 |
| 9 | 1001 | 9 |
| 10 | 1010 | A |
| 11 | 1011 | B |
| 12 | 1100 | C |
| 13 | 1101 | D |
| 14 | 1110 | E |
| 15 | 1111 | F |

With respect to XOR function, the logical operation exclusive disjunction, also called exclusive or, (symbolized XOR or EOR), is a type of logical disjunction on two operands that results in a value of “true” if and only if exactly one of the operands has a value of “true.” Put differently, exclusive disjunction is a logical operation on two logical values, typically the values of two propositions, that produces a value of true just in cases where the truth value of the operands differs.

The truth table of pXORq (also written as $p \oplus q$, or $p \neq q$) is as follows in Table VII, below:

TABLE VII

| P | Q | $\oplus$ |
|---|---|---|
| F | F | F |
| F | T | T |
| T | F | T |
| T | T | F |

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cartridge chip for use with an imaging cartridge installed in an imaging device, comprising:

a memory element storing imaging cartridge data, wherein the memory element includes a separate read-only memory subunit and a separate writable memory subunit;

wherein the imaging device is selectively operable to read the memory element of the cartridge chip and write to the memory element of the cartridge chip;

wherein the cartridge chip is unable to determine the type of the imaging device;

wherein the cartridge chip is selectively operable to function with a plurality of imaging devices; and a controller for controlling the operation of the cartridge chip;

wherein the controller is selectively operable to transmit at least one data frame to the imaging device in order to acknowledge a reading of the memory element of the cartridge chip by the imaging device;

wherein the imaging device is selectively operable to transmit at least one data frame to the controller in order to write to the memory element of the cartridge chip;

wherein the controller is selectively operable to acknowledge the writing to the memory element of the cartridge chip by the imaging device;

wherein the memory element of the cartridge chip can not transmit a correct data frame to another type of the imaging device.

2. The invention according to claim 1, wherein the read-only memory subunit includes a data frame corresponding to only a portion of an operational requirement of at least one imaging device.

3. The invention according to claim 2, wherein the writable memory subunit includes a data frame corresponding to a remainder of the portion of the operational requirement of at least one imaging device.

4. The invention according to claim 1, further comprising a plurality of separate read-only memory subunits.

5. The invention according to claim 4, wherein the plurality of read-only memory subunits include data frames corresponding to only a portion of an operational requirement of a plurality of imaging devices.

6. The invention according to claim 5, wherein the writable memory subunit includes a data frame corresponding to a remainder of the portion of the operational requirement of the plurality of imaging devices.

7. The invention according to claim 1, wherein the controller is selectively operable to receive at least one data frame from the imaging device.

8. The invention according to claim 1, wherein the imaging device is selectively operable to transmit at least one data frame to the controller in order to initialize the cartridge chip.

9. The invention according to claim 8, wherein the controller is selectively operable to transmit at least one data frame to the imaging device in order to acknowledge the initialization of the cartridge chip.

10. The invention according to claim 9, wherein the imaging device is selectively operable to transmit at least one data frame to the controller in order to read the memory element of the cartridge chip.

11. The invention according to claim 1, wherein the imaging cartridge data is compatible with more than one type of imaging device.

12. The invention according to claim 1, further comprising a radio frequency antenna operably associated with the memory element.

13. A method for operating an imaging system, comprising:

providing a cartridge chip for use with an imaging cartridge installed in an imaging device;

the cartridge chip including a memory element storing imaging cartridge data, wherein the memory element includes a separate read-only memory subunit and a separate writable memory subunit;

the imaging device selectively reading the memory element of the cartridge chip and writing to the memory element of the cartridge chip;

wherein the cartridge chip is unable to determine the type of the imaging device;

wherein the cartridge chip is selectively operable to function with a plurality of imaging devices; and providing a controller for controlling the operation of the cartridge chip;

wherein the controller transmits at least one data frame to the imaging device in order to acknowledge a reading of the memory element of the cartridge chip by the imaging device;

wherein the imaging device transmits at least one data frame to the controller in order to write to the memory element of the cartridge chip;

wherein the controller acknowledges the writing to the memory element of the cartridge chip by the imaging device;

wherein the memory element of the cartridge chip can not transmit a correct data frame to another type of the imaging device.

14. The invention according to claim 13, wherein the read-only memory subunit includes a data frame corresponding to only a portion of an operational requirement of at least one imaging device.

15. The invention according to claim 14, wherein the writable memory subunit includes a data frame corresponding to a remainder of the portion of the operational requirement of at least one imaging device.

16. The invention according to claim 13, further comprising providing a plurality of separate read-only memory subunits.

17. The invention according to claim 16, wherein the plurality of read-only memory subunits include data frames corresponding to only a portion of an operational requirement of a plurality of imaging devices.

18. The invention according to claim 17, wherein the writable memory subunit includes a data frame corresponding to a remainder of the portion of the operational requirement of the plurality of imaging devices.

19. The invention according to claim 13, wherein the controller receives at least one data frame from the imaging device.

20. The invention according to claim 13, wherein the imaging device transmits at least one data frame to the controller in order to initialize the cartridge chip.

21. The invention according to claim 20, wherein the controller transmits at least one data frame to the imaging device in order to acknowledge the initialization of the cartridge chip.

22. The invention according to claim 21, wherein the imaging device transmits at least one data frame to the controller in order to read the memory element of the cartridge chip.

23. The invention according to claim 13, wherein the imaging cartridge data is compatible with more than one type of imaging device.

24. The invention according to claim 13, further comprising providing a radio frequency antenna operably associated with the memory element.

* * * * *